G. T. SAMPSON.
THREADING DEVICE.
APPLICATION FILED FEB. 19, 1910.
1,001,893.
Patented Aug. 29, 1911.
4 SHEETS—SHEET 1.
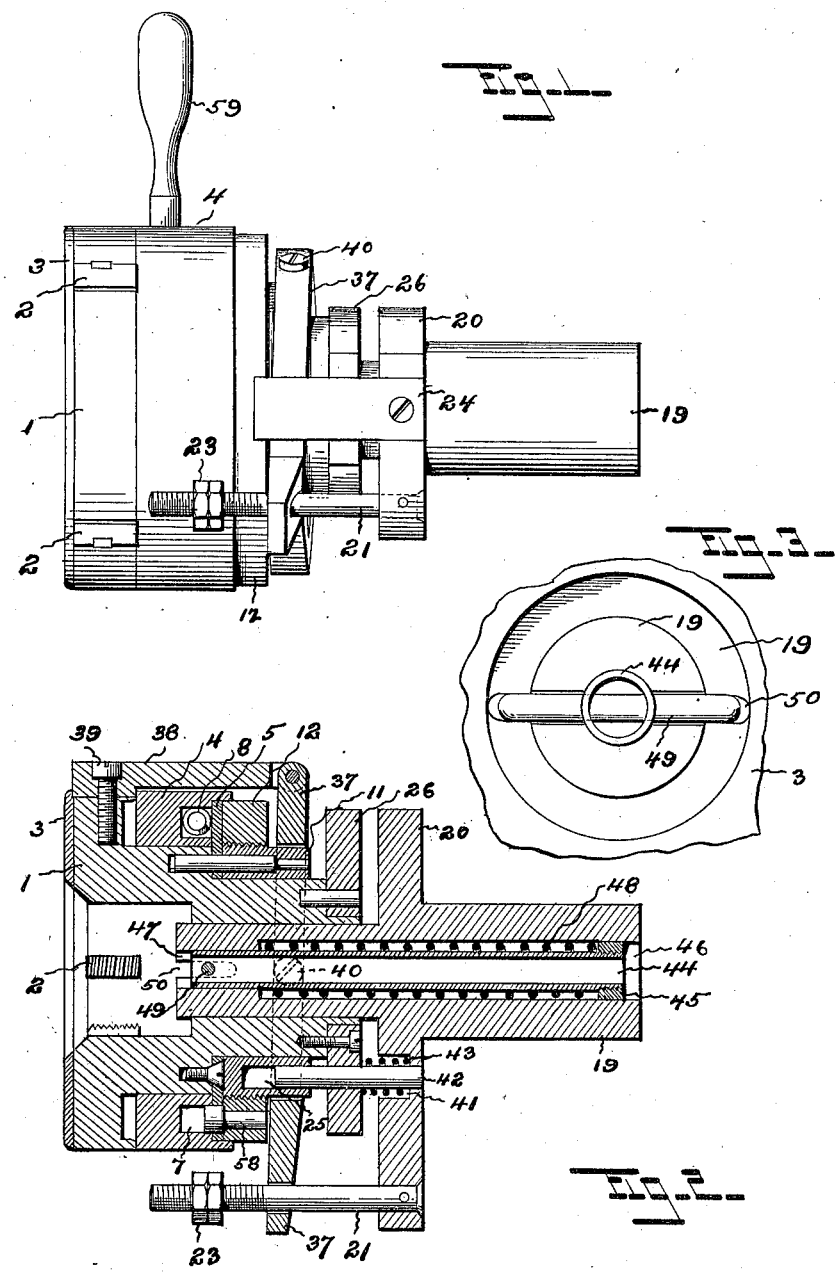
WITNESSES:
Florence H. Monk.
Lucy Brennan.
INVENTOR
George T. Sampson
BY George P. Hall
ATTORNEY

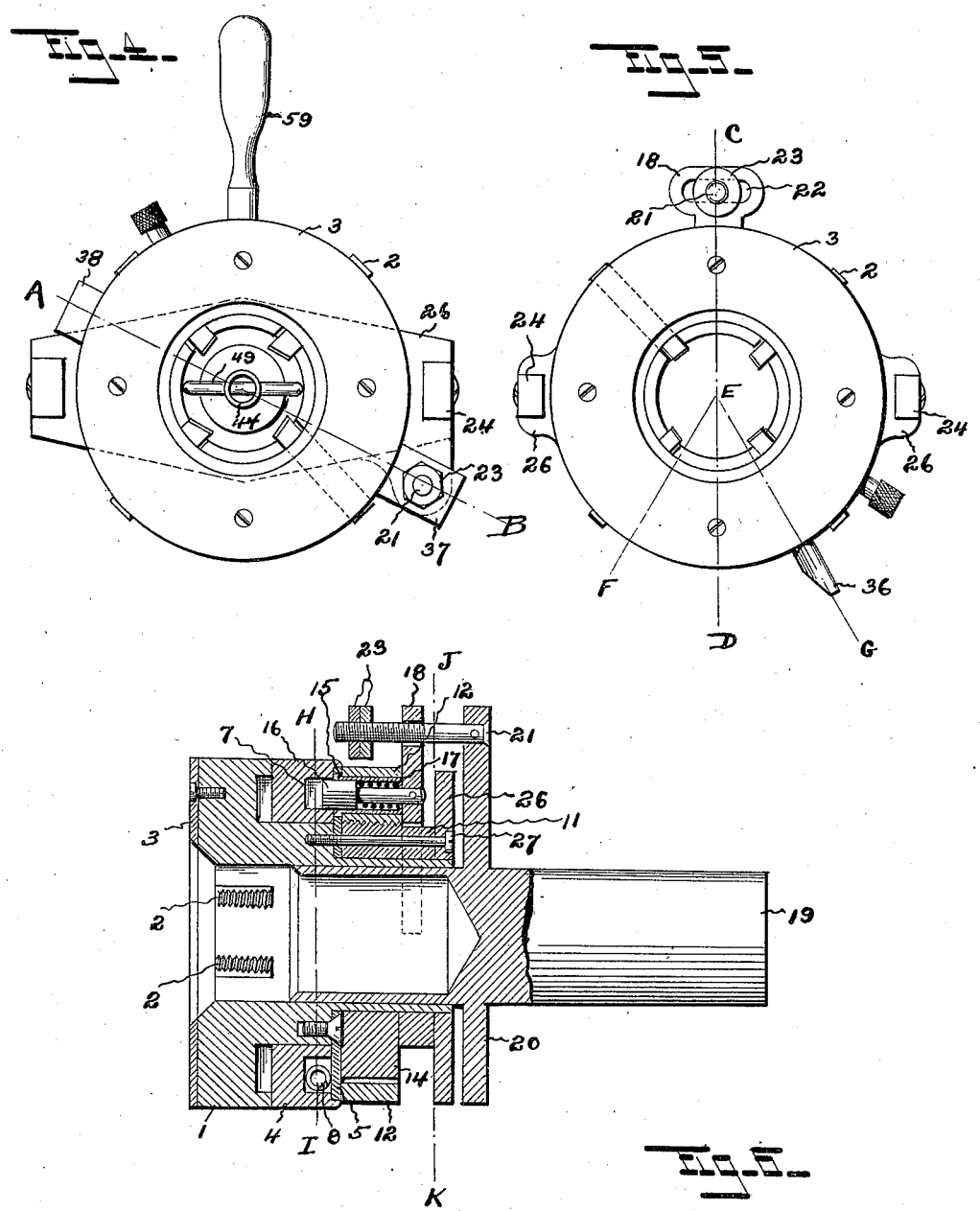

G. T. SAMPSON.
THREADING DEVICE.
APPLICATION FILED FEB. 19, 1910.
1,001,893.
Patented Aug. 29, 1911.
4 SHEETS—SHEET 3.
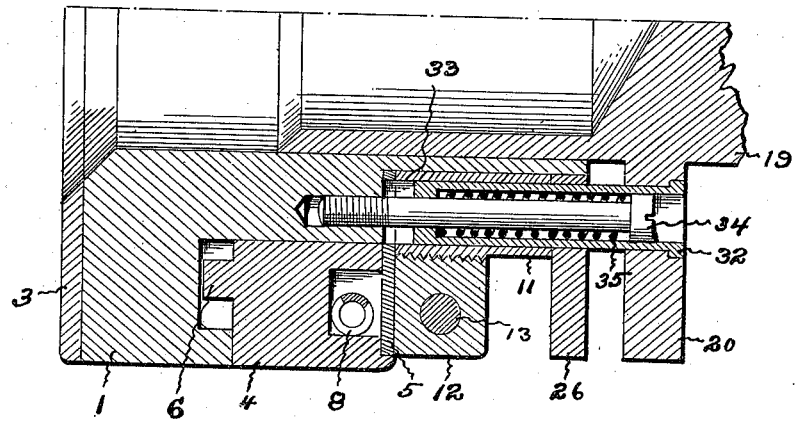
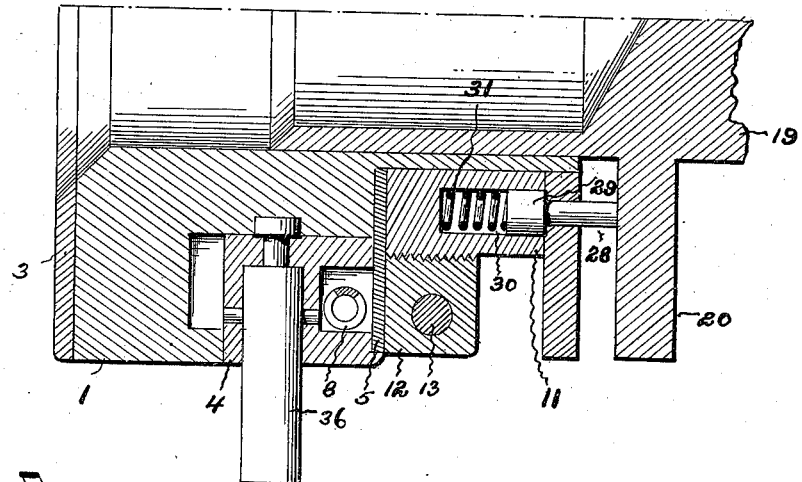
WITNESSES:
INVENTOR
BY
ATTORNEY

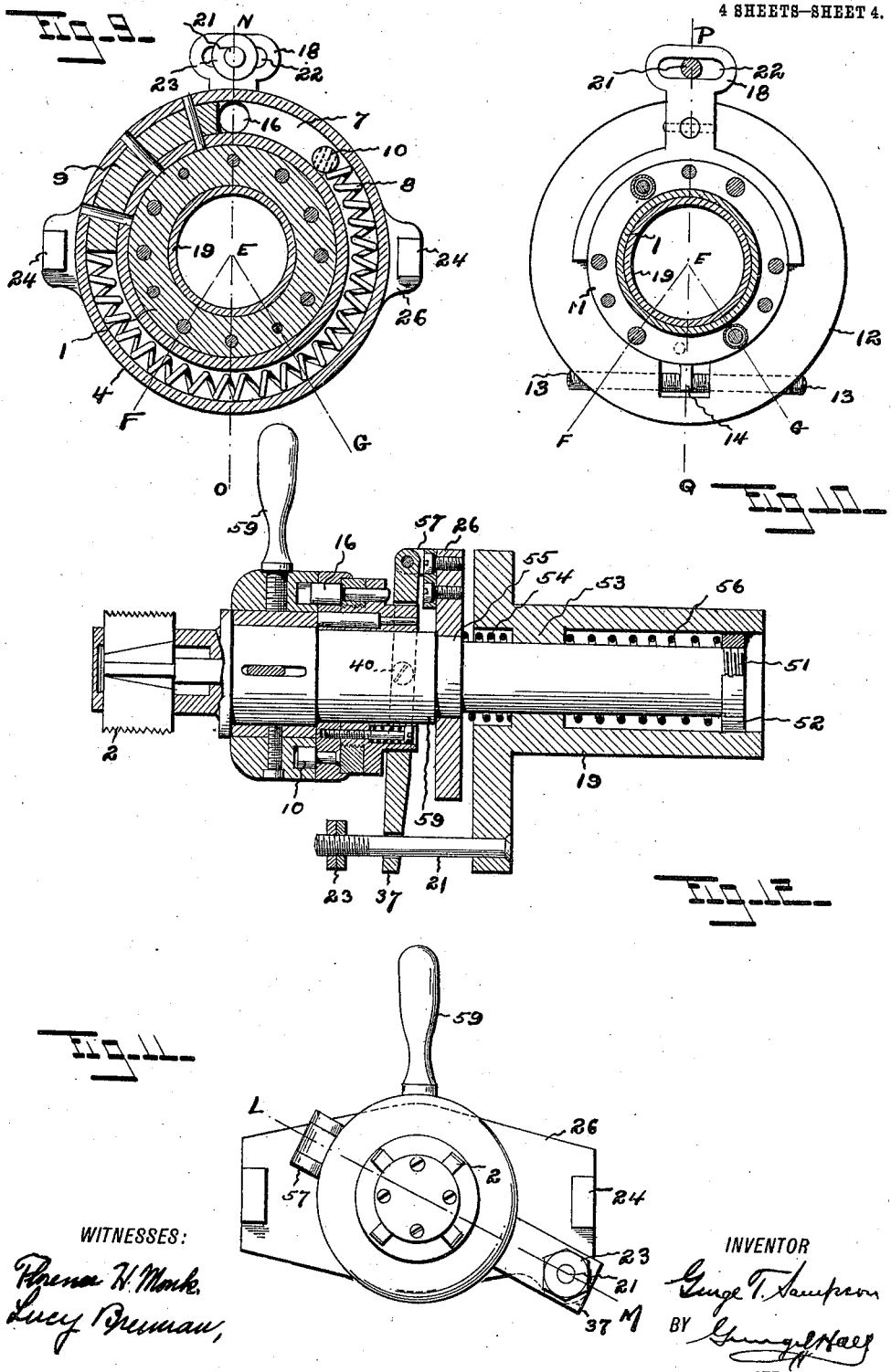

UNITED STATES PATENT OFFICE.

GEORGE T. SAMPSON, OF NEW HAVEN, CONNECTICUT, ASSIGNOR TO THE GEOMETRIC TOOL COMPANY, OF NEW HAVEN, CONNECTICUT, A CORPORATION OF CONNECTICUT.

THREADING DEVICE.

1,001,893.  Specification of Letters Patent.  Patented Aug. 29, 1911.

Application filed February 19, 1910. Serial No. 544,922.

*To all whom it may concern:*

Be it known that I, GEORGE T. SAMPSON, a citizen of the United States, residing at New Haven, in the county of New Haven and State of Connecticut, have invented certain new and useful Improvements in Threading Devices, of which the following is a specification, reference being had therein to the accompanying drawings.

My invention relates to new and useful improvements in threading devices, and has for its object, among other things, to provide therein mechanism that will permit a slight yielding movement of the thread chasers as they come in contact with the work; to mount the chasers so that they will be advanced by the lead of the thread being cut; to automatically move the chasers away from the threaded surface after a thread of predetermined length has been cut and return them to their original position; and to so design the several parts that these and other objects may be obtained by the attachment of my improved mechanism to the type of threading device now in common use.

To these, and other ends, my invention consists in the die head having certain details of construction and combinations of parts as will be hereinafter described and more particularly pointed out in the claims.

Referring to the drawings, in which like numerals of reference designate like parts in the several figures; Figure 1 is a side view of a head constructed in accordance with my invention; Fig. 2 is a sectional view thereof upon line A—B of Fig. 4; Fig. 3 is an enlarged view of a portion of the body member and some of the parts adjacent thereto; Fig. 4 is a front view of the die head shown in Fig. 1; Fig. 5 is a front view of a die head having my improvements connected therewith, but differing slightly in its details; Fig. 6 is a sectional view thereof upon line C—D of Fig. 5, N—O of Fig. 9, and P—Q of Fig. 10; Fig. 7 is a fragmentary view of the parts taken upon line E—F of Figs. 5 and 9; Fig. 8 is a fragmentary view of the parts taken upon line E—G of Figs. 5 and 9; Fig. 9 is a transverse sectional view of the parts taken upon line H—I of Fig. 6; Fig. 10 is a similar view taken upon line J—K of Fig. 6; Fig. 11 is a front elevation of a tap having my improved mechanism connected therewith; and Fig. 12 is a sectional view thereof upon line L—M of Fig. 11.

My invention is especially adapted to use with turret lathe threading devices, although not limited thereto. In this type of threading device, now in common use, the thread chasers are mounted in rigid parts and are frequently broken or injured by the shock resulting from the sudden contact of the stock therewith. In my device this difficulty in the art is overcome by a buffer mechanism, that is, by mounting the thread chasers so that they will yield slightly as they contact with the stock to be threaded, which relieves the shock upon the chasers and enables them to take a good hold upon the stock without excessive work or strain thereon. These threading devices are usually advanced, while cutting a thread, at a uniform speed through mechanical means connected either directly or indirectly with a screw thread, hence the threading device moves at the same speed as the lead of the screw, which is seldom the same pitch as that of the thread being cut. For illustration, if the screw operating the threading device is ten-pitch and the thread being cut fourteen-pitch, it is apparent that the chasers will either strip the thread or cross the same so that the resulting work is imperfect. Many devices have heretofore been made to so regulate the speed of the threading device in relation to the feed screw that the chasers will not strip the thread being cut, but all of these devices have been more or less unsuccessful, complex and costly. In my device the chasers are advanced at the same speed as the pitch of the thread being cut, by mounting them in a member that has a floating movement upon a part advanced at a fixed speed by the operating screw.

My invention may, and is usually, applied to a type of threading device in common use, such as a die head, which is illustrated in the drawings, with such slight modifications therein as are necessitated by the attachment of my improvements thereto. This die head is constructed with a carrier 1, within which the thread chasers 2, held against outward movement by a front plate 3, are actuated by a cam 4, which has a rotary movement upon said carrier against the rear plate 5, and provided with lugs 6 which enter grooves (not shown) in the said chasers. Within an annular recess 7, in the rear of said cam, is a spring 8 that abuts at one end against the filing block 9 fixed in said recess, and at the other end against the stop pin 10 connected with the rear plate 5. Surrounding said carrier, adjacent to the rear plate 5, is the externally threaded collar 11, upon which is threaded the adjusting ring nut 12 that has a limited rotary adjustment by means of the screws 13 that are threaded through the nut 12 and abut against the lug 14 fixed to said collar. Longitudinally movable in the bushing 15, in the adjusting ring nut 12, is the locking bolt 16, which in one of its positions projects into the recess 7 and abuts against one end of the filling block 9 (see Fig. 9), being normally held in this position by a spring 17 which surrounds the shank of said bolt and lies between the head thereof and the end of said bushing. Secured to the rear end of the carrier, by the screws 27, is the drive plate 26, and held against the rear face of the adjusting ring nut 12 is the trip lever 18.

The carrier, with all of the above described mechanism connected therewith, has an endwise movement upon the body member 19, which is provided with an integral arm 20 having a threaded rod 21 fixed therein, which projects through a slot 22 in the trip lever 18, and having the jam nuts 23 thereon. The body member 19 is usually mounted in the spindle of a lathe or the head of a turret machine, and has a movement in the direction of its axis, at a fixed and definite speed, while the carrier has an independent axial movement upon said body member, being prevented from rotation thereon by the guide blocks 24, which are fixed in the arms 20 and project through axial grooves in the drive plate 26.

The buffer mechanism may be constructed in any one of several ways, and in the drawings (Figs. 2, 8 and 12), I have illustrated three of such constructions. The type shown in Fig. 8 is constructed with a plurality of pins 28, with heads 29 thereon, that are slidably mounted in the recesses 30 in the collar 11, within which are the springs 31 that exert their tension so as to move the carrier upon said body member away from the arm 20, but yield as soon as the chasers come in contact with the stock to be threaded and act as a buffer therefor, taking the entire shock. Another type of buffer mechanism is that shown in Fig. 2, wherein a pin 42, fixed in the arm 20, projects through the drive plate 26 into a recess 25 in the collar 11 and is surrounded by a spring 43 between the said drive plate and a recess 41 in said arm. The mechanism for returning the carrier after the thread cutting operation is also made in any one of several preferred forms, some of which are illustrated in Figs. 2, 7 and 12.

Referring to Fig. 7 the numeral 32 designates a bushing that is fixed in the arm 20, and projects into, and has a sliding movement within a recess 33 in the drive plate 26, collar 11 and rear plate 5, 34 a screw that passes through said bushing and is threaded into the carrier 1, and 35 is a spring that surrounds said screw between the head thereof and the bottom of said bushing. While the chasers are cutting the thread, the lead of said thread moves the carrier axially upon the body member at the same speed as the pitch of the thread away from the arm 20 and against the tension of the springs 35. This movement of the carrier is independent of that of the body member 19, which moves at a uniform speed irrespective of the pitch of the thread being cut, the difference in speeds being equalized by the floating movement of the carrier. After a thread of predetermined length has been cut the chasers are disengaged therefrom and the spring 31 moves the carrier to its original position.

A second means for accomplishing the operation just described is shown in Fig. 2, wherein a sleeve 44 having a head 45 thereon, is movable within the differential bores 46 and 47 in the body member, and surrounded by the spring 48, which lies between the end of the bores 46 and the head 45. A pin 49 fixed in said sleeve 44, and sliding within the slot 50 in the body member, permits an endwise movement of the carrier upon said body member. As the carrier moves upon the body member 19 the trip plate 18 is brought in contact with the jam nuts 23, which have been previously adjusted so as to permit the cutting of a thread of desired length and the locking bolt is withdrawn from the recess 7 out of the path of the filling block 9. The spring 8 now imparts a slight rotary movement to the cam 4, limited by the contact of the plate 9 with the stop pin 10, and the chasers are moved away from the threaded surface by the engagement of the lugs upon the cam with the chasers. A rotary movement is imparted to the cam in the opposite direction, so as to return the chasers to their cutting position, through a pin 36, that contacts with a fixed part (not shown) during the movement of the turret head, which moves said cam about its axis to a point where the spring 17 will again force the locking bolt 16 into the recess 7, the position shown in Fig. 9, at which time the pin 36 will pass its obstruction and the threading operation continue as before.

A modified means of mounting the trip plate is shown in Figs. 1 and 2, wherein the numeral 37 designates the trip plate, which is hinged at one end to a plate 38 secured by the screw 39 to the carrier and fulcrumed to the collar 11 by the screw 40, and 58 the locking bolt which is fixed in the adjusting ring nut 12.

Another modified form of buffer and carrier return mechanism is shown in Fig. 12, wherein the chaser operating mechanism is substantially the same as that above described, except that they are mounted for internal instead of external cutting. In this modified construction the carrier 59 has a shank 51 thereon which is supported by the journal 53, and the washer 52 with a buffer spring 54 surrounding said shank between the nut journal 53 and the enlargement 55 on said carrier, and the return spring 56 also surrounding the said shank between the nut 52 and said journal 53. In said Fig. 12 the trip lever 37 is hinged to a bracket 57 secured to the drive plate 26.

There are minor changes and alterations that can be made within my invention, aside from those herein suggested, and I would therefore have it understood that I do not limit myself to the exact construction herein shown and described, but claim all that falls fairly within the spirit and scope of my invention.

Having described my invention, what I claim as new, and desire to secure as new, is:—

1. In a threading device, the combination with a body member; of a carrier member; thread chasers mounted in said carrier member; spring means for connecting said body and carrier members, whereby they may have an endwise movement in relation to each other; a cam for moving said chasers within said carrier; a spring for moving said cam in one direction; a bolt to obstruct the action of said spring; pivotally mounted means on said carrier for actuating said bolt, and thereby releasing said spring; a fixed part upon one of said members; and an adjustable part upon said fixed part in the path of said pivotally mounted means.

2. In a threading device, the combination with a body member; of a carrier; thread chasers mounted in said carrier; a cam for moving said chasers in said carrier; a spring for moving said cam in one direction; a bolt to obstruct the action of said spring; pivotally mounted means on said carrier for actuating said bolt, and thereby releasing said spring; spring means for connecting said body member and carrier, whereby they may have an endwise movement in relation to each other; and a fixed part upon said body member from which said pivotally mounted means are actuated at a predetermined time.

3. In a threading device, the combination with a body member; of a carrier, having a portion thereon within said body member; thread chasers mounted in said carrier; means for movably connecting said carrier with said body member; and yielding means, for resisting the movement of said carrier in relation to said body member, in either direction.

4. In a threading device, the combination with a body member; of a carrier; chasers mounted in said carrier; means for movably connecting said carrier with said body member; and companion springs of varying tensions, for resisting the movement of said carrier in relation to said body member in either direction.

In testimony whereof I affix my signature in presence of two witnesses.

GEORGE T. SAMPSON.

Witnesses:
GEORGE E. HALL,
SAMUEL J. NATHANSON.